United States Patent
Liu et al.

(10) Patent No.: US 10,458,637 B1
(45) Date of Patent: Oct. 29, 2019

(54) HIGH-INTELLIGENT LED STREET LAMP

(71) Applicant: Xiaojun Liu, Shenzhen (CN)

(72) Inventors: Xiaojun Liu, Shenzhen (CN); Junlong Liu, Shenzhen (CN)

(73) Assignee: Xiaojun Liu, Shenzhen (CN)

( * ) Notice: Subject to any disclaimer, the term of this patent is extended or adjusted under 35 U.S.C. 154(b) by 0 days.

(21) Appl. No.: 16/243,103

(22) Filed: Jan. 9, 2019

(30) Foreign Application Priority Data

Jul. 19, 2018 (CN) .......................... 2018 1 0795081

(51) Int. Cl.
| | |
|---|---|
| *F21V 23/02* | (2006.01) |
| *F21S 9/04* | (2006.01) |
| *F21V 29/70* | (2015.01) |
| *F21V 29/89* | (2015.01) |
| *H05B 37/02* | (2006.01) |
| *G08B 3/10* | (2006.01) |
| *F21W 131/103* | (2006.01) |
| *F21Y 115/10* | (2016.01) |

(52) U.S. Cl.
CPC .............. *F21V 23/023* (2013.01); *F21S 9/04* (2013.01); *F21S 9/043* (2013.01); *F21V 29/70* (2015.01); *F21V 29/89* (2015.01); *G08B 3/10* (2013.01); *H05B 37/0227* (2013.01); *H05B 37/0272* (2013.01); *H05B 37/0281* (2013.01); *F21W 2131/103* (2013.01); *F21Y 2115/10* (2016.08)

(58) Field of Classification Search
CPC ........ F21V 23/023; F21V 29/70; F21V 29/89; H05B 37/0281; H05B 37/0272; H05B 37/0227; F21S 9/04; F21S 9/043; G08B 3/10; F21W 2131/103; F21Y 2115/10
See application file for complete search history.

(56) References Cited

FOREIGN PATENT DOCUMENTS

| CN | 207796838 U | * | 8/2018 |
|---|---|---|---|
| KR | 20160142014 A | * | 12/2016 |

* cited by examiner

*Primary Examiner* — Bao Q Truong
*Assistant Examiner* — Glenn D Zimmerman

(57) ABSTRACT

A high-intelligent LED street lamp includes a control box, a signal display box arranged on an upper portion of the control box, and a support rod arranged on an upper portion of the signal display box. An LED street lamp assembly, a solar panel assembly, and a wind power generation assembly are sequentially arranged on the support rod. A controller, a rectify and filter unit, a constant-current protection unit, a power supply, a data memory, a wireless communication transmission unit; an alerter, a sound device, and a voltage stabilizer are arranged inside the control box. The wireless communication transmission unit is configured to communicate with external mobile terminals and the alerter is configured to generate an alarm sound in case of an emergency.

6 Claims, 2 Drawing Sheets

US 10,458,637 B1

HIGH-INTELLIGENT LED STREET LAMP

BACKGROUND

1. Technical Field

The present disclosure relates to a field of light emitting diode (LED) street lamp technology, and in particular to a high-intelligent LED street lamp with reasonable structural design and good use effect.

2. Description of Prior Art

Current global energy consumption is increasing dramatically and energy shortage is extremely scarce. Power shortage has endangered our lives. How to save energy has become a very urgent issue. As a new type of green product, a light emitting diode (LED) lighting product has advantages, such as energy saving and environmental protection, small size, and long life, which is bound to be a development trend of ordinary lighting in future.

However, most conventional LED street lamps are powered by external power supplies. Such a conventional structural design requires a large amount of electric energy, which is costly and puts a large burden on users, and further, goes against a promotion and use of the products.

Base on above problems, a large number of research, development and experiments have been carried out by those skilled in the art, and improvements have been made from various aspects such as specific structures and functions of the LED street lamp, and good results have been obtained.

SUMMARY

In order to overcome the problems existing in the prior art, the present disclosure provides a high-intelligent LED street lamp with reasonable structural design and good use effect.

Compared with the prior art, the present disclosure of a high-intelligent light emitting diode (LED) street lamp comprises a control box, a signal display box arranged on an upper portion of the control box, and a support rod arranged on an upper portion of the signal display box. An LED street lamp assembly, a solar panel assembly, and a wind power generation assembly are sequentially arranged on the support rod. A controller, a rectify and filter unit, a constant-current protection unit, a power supply, a data memory, a wireless communication transmission unit; an alerter, a sound device, and a voltage stabilizer are arranged inside the control box. The wireless communication transmission unit is configured to communicate with external mobile terminals and the alerter is configured to generate an alarm sound in case of an emergency. In an actual use, specific structural designs of the LED street lamp assembly, the solar panel assembly and the wind power generation assembly are able to provide a good use effect of the high-intelligent LED street lamp. In particularly, when an external environment changes, rotational structural designs of a first rotary assembly and a second rotary assembly make effective use of lights and improve a performance of illumination and acquisition of light energy. Thus, a structural design of the present disclosure is reasonable.

DETAILED DESCRIPTION

To make the objects, technical proposals and merits of the present disclosure more apparent, the present disclosure will be further described in detail with reference to the drawings and embodiments. It should be understood that the embodiments described here are only used to illustrate the present disclosure and are not intended to limit the present disclosure.

Figure 1:
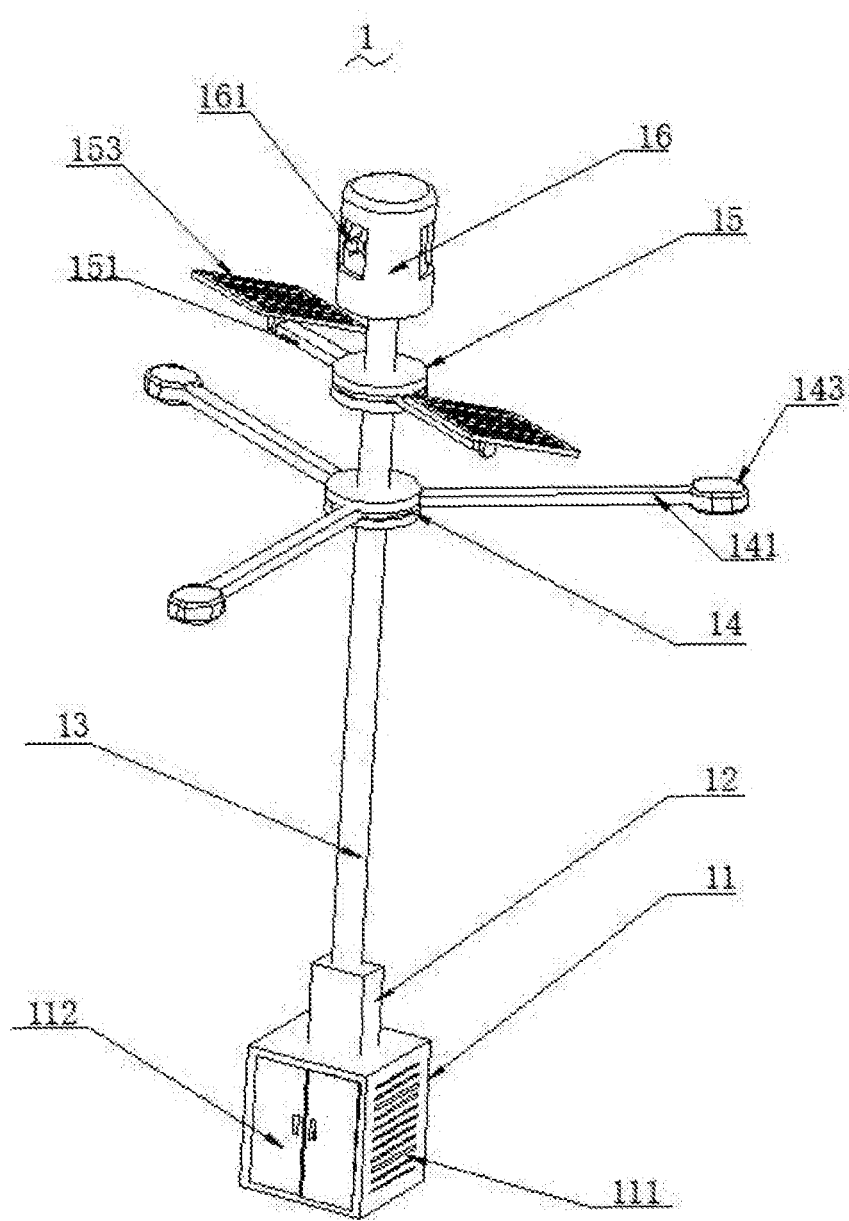
FIG. 1 is a perspective view showing a structure diagram of a high-intelligent light emitting diode (LED) street lamp of the present disclosure.
Figure 2:
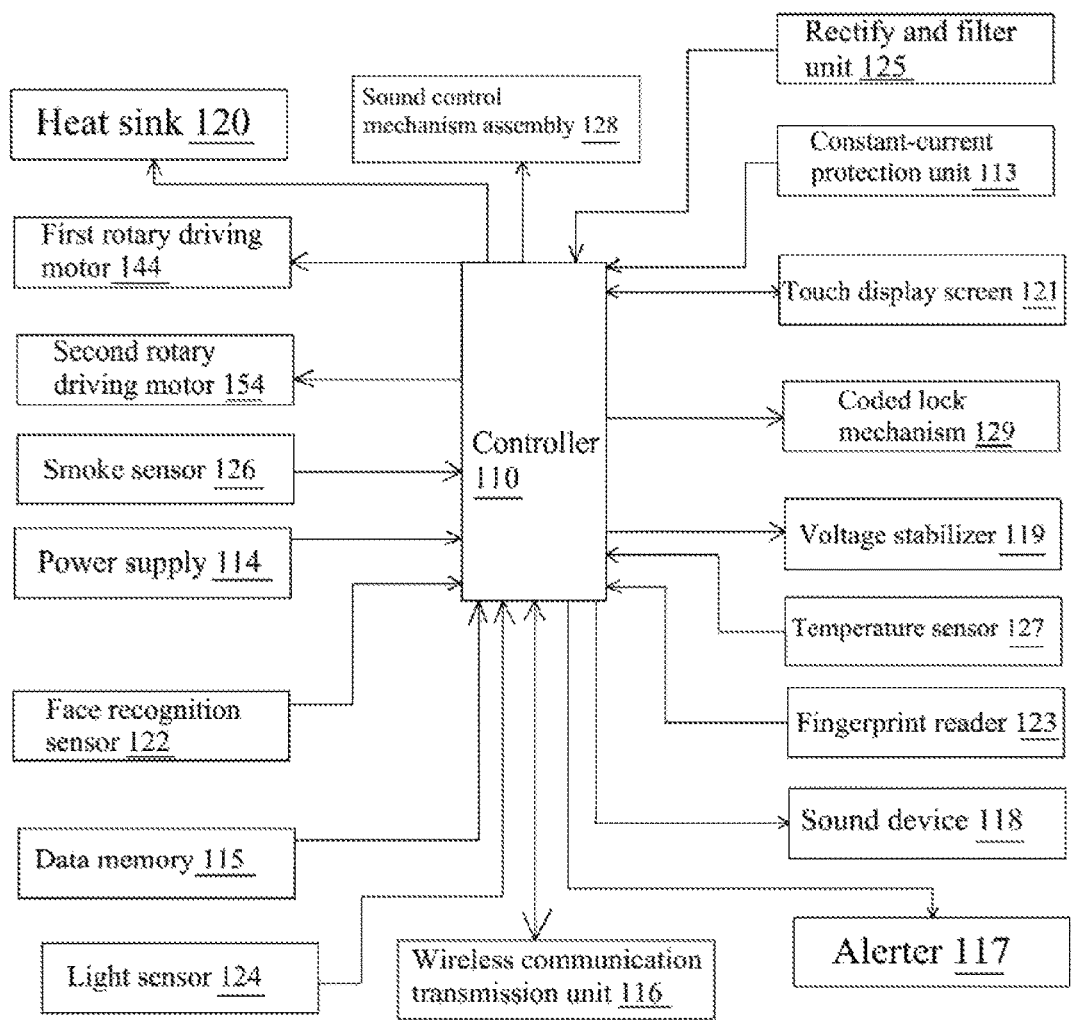
FIG. 2 is a structure diagram showing a circuit connection structure of the high-intelligent LED street lamp of the present disclosure.

As shown in FIG. 1 and FIG. 2, the present disclosure of a high-intelligent light emitting diode (LED) street lamp 1 comprises a control box 11, a signal display box 12 arranged on an upper portion of the control box 11, and a support rod 13 arranged on an upper portion of the signal display box 12. An LED street lamp assembly, a solar panel assembly, and a wind power generation assembly are sequentially arranged on the support rod 13. A controller 110, a rectify and filter unit 125, a constant-current protection unit 113, a power supply 114, a data memory 115, a wireless communication transmission unit 116, an alerter 117, a sound device 118, and a voltage stabilizer 119 are arranged inside the control box 11. The wireless communication transmission unit 116 is configured to communicate with external mobile terminals and the alerter 117 is configured to generate an alarm sound in case of an emergency. A touch display screen 121, a face recognition sensor 122, a fingerprint reader 123, and a light sensor 124 are arranged on an outer side of the signal display box 12. The touch display screen 121 is configured to display information. The face recognition sensor 122 is configured to perform face recognition and face sensing. The fingerprint reader 123 is configured to control an operation of the LED street lamp 1. The light sensor 124 is configured to perform real-time sensing of external light intensity. The rectify and filter unit 125, the constant-current protection unit 113, the power supply 114, the data memory 115, the wireless communication transmission unit 116, the alerter 117; the sound device 118, the voltage stabilizer 119, the touch display screen 121, the face recognition sensor 122, the fingerprint reader 123 and the light sensor 124 are electrically connected with the controller 110. A heat sink 120 for improving a heat dissipation performance of the LED street lamp 1 is arranged inside the control box 11. Two sides of the control box 11 defining a plurality of heat dissipation holes 11. An access door 112 is arranged on a front surface of the control box 11.

The LED street lamp assembly comprises a first rotary assembly 14, a plurality of street lamp rods 141 connected with an end of the first rotary assembly 14, and LED lamp bodies 143. Each of the LED lamp bodies 143 is arranged on an other end relative to the first rotary assembly 14 of the street lamp rod 141. A first rotary driving motor 144 is arranged inside the first rotary assembly 14. The first rotary assembly 14 is driven by the first rotary driving motor 144 and rotates along with the lamp rods 141 around the support rod 13.

The solar panel assembly comprises a second rotary assembly 15, a plurality of solar panel connect rods 151 connected with an end of the second rotary assembly 15, and solar panels 153. The solar panel 153 is arranged on an other end relative to the second rotary assembly 15 of each of the solar panel connect rods 151. A second rotary driving motor 154 is arranged inside the second rotary assembly 15. The second rotary assembly 15 is driven by the second rotary driving motor 154 and rotates along with the solar panel connect rods 151 around the support rod 13.

The wind power generation assembly comprises a power generation box 16 and at least three power generation fans 161 arranged inside the power generation box 16. A lateral side of the power generation box 16 defining a ventilation window, and the power generation fans 161 arranged close to the vent window. A storage battery is arranged inside the control box 11. The heat sink 120, the first rotary driving motor 144, the solar panel 153, the second rotary driving motor 154, the power generation fans 161 are electrically connected with the controller 110. A smoke sensor 126 and a temperature sensor 127 are arranged inside the control box 11. The smoke sensor 126 and the temperature sensor 127 are electrically connected with the controller 110. A waterproof protective cover relatively covers an external portion of the control box 11 and an external portion of the signal display box 12. The heat dissipation holes 111 of the control box 11 are long-strip holes. Each of the heat dissipation holes 111 range from 3-5 cm in width. A sound control mechanism assembly 128 and a coded lock mechanism 129 are arranged on the external portion of the signal display box 12. The sound control mechanism assembly 128 and the coded lock mechanism 129 are electrically connected with the controller 110.

The present disclosure of the high-intelligent light emitting diode (LED) street lamp 1 comprises the control box 11, the signal display box 12 arranged on the upper portion of the control box 11, and the support rod 13 arranged on an upper portion of the signal display box 12. The LED street lamp assembly, the solar panel assembly, and the wind power generation assembly are sequentially arranged on the support rod 13. The controller 110, the rectify and filter unit 125, the constant-current protection unit 113, the power supply 114, the data memory 115, the wireless communication transmission unit 116; the alerter 117, the sound device 118, and the voltage stabilizer 119 are arranged inside the control box 11. The wireless communication transmission unit 116 is configured to communicate with external mobile terminals and the alerter is configured to generate the alarm sound in case of the emergency. In an actual use, specific structural designs of the LED street lamp assembly, the solar panel assembly and the wind power generation assembly are able to provide a good use effect of the high-intelligent LED street lamp 1. In particular, when an external environment changes, rotational structural designs of the first rotary assembly 14 and the second rotary assembly 15 make effective use of lights and improve a performance of illumination and acquisition of light energy. Thus, a structural design of the present disclosure is reasonable.

Furthermore, the support rod 13 comprises a first support rod and a second support rod connected with the first support rod. And a driving cylinder is arranged inside the first support rod. The driving cylinder drives the second support rod to moves up and down relative to the first support rod. The driving cylinder is electrically connected with the controller 110.

Furthermore, a first heat dissipating material layer, a second heat dissipating material layer, and a third heat dissipating material layer are formed on the external portion of the signal display box 12. The first heat dissipating material layer is an aluminum plate layer. The second heat dissipating material layer is a graphite layer. And the third heat dissipating material layer is a pressure sensitive adhesive layer. The first heat dissipating material layer ranges from 0.25-0.35 mm in thickness. The second heat dissipating material layer ranges from 0.15-0.45 mm in thickness. The third heat dissipating material layer ranges from 0.27-0.35 mm in thickness. The third heat dissipating material layer is composed of following components in parts by weight:

95 parts of an acrylate adhesive, 0.1-2.5 parts of an isocyanate crosslinking agent, 25-40 parts of a diluent, 0.65-1 parts of an epoxy crosslinking agent, 4-17 parts of azo compound, 3-15 parts of rosin resin, 6-16 parts of N-nitroso compound, 0.4-2 part of coupling agent, 0.6-1.7 parts of an acrylate polymer having a viscosity of 2500-3500 cps.

The first heat dissipating material layer defining a plurality of through holes, each through hole ranges from 0.3-1 mm in aperture.

Furthermore, the wireless communication transmission unit 116 comprises a wireless BLUETOOTH unit, a 2.4G wireless communication unit, and a WIFI transmission unit.

Furthermore, a plurality of solar energy panels are arranged on the solar panel 153. The solar energy panels are arranged side by side at equal intervals, and each of the spacing between the solar energy panels range from 0.55-0.85 cm.

Furthermore, a timing controller is arranged inside the control box 11, and the timing controller is electrically connected with the controller 110.

Compared with the prior art, the present disclosure of the high-intelligent light emitting diode (LED) street lamp 1 comprises the control box 11, the signal display box 12 arranged on the upper portion of the control box 11, and the support rod 13 arranged on an upper portion of the signal display box 12. The LED street lamp assembly, the solar panel assembly, and the wind power generation assembly are sequentially arranged on the support rod 13. The controller 110, the rectify and filter unit 125, the constant-current protection unit, the power supply, the data memory, the wireless communication transmission unit 116, the alerter 117, the sound device 118, and the voltage stabilizer 119 are arranged inside the control box 11. The wireless communication transmission unit 116 is configured to communicate with external mobile terminals and the alerter 117 is configured to generate the alarm sound in case of the emergency. In the actual use, specific structural designs of the LED street lamp assembly, the solar panel assembly and the wind power generation assembly are able to provide the good use effect of the high-intelligent LED street lamp 1. In particular, when the external environment changes, the rotational structural designs of the first rotary assembly 14 and the second rotary assembly 15 make effective use of lights and improve the performance of illumination and acquisition of light energy. Thus, the structural design of the present disclosure is reasonable.

The above-described embodiments of the present disclosure are not to be construed as limiting the scope of the present disclosure. Any of the modifications, equivalent replacement, and improvement within the spirit and principle of the present disclosure should fall within the protection scope of the claim.

What is claimed is:

1. A high-intelligent light emitting diode (LED) street lamp, comprising:
   a control box;
   a signal display box arranged on an upper portion of the control box; and
   a support rod arranged on an upper portion of the signal display box;
   wherein an LED street lamp assembly, a solar panel assembly, and a wind power generation assembly are sequentially arranged on the support rod; a controller, a rectify and filter unit, a constant-current protection unit, a power supply, a data memory, a wireless communication transmission unit, an alerter, a sound device, and a voltage stabilizer are arranged inside the control box; the wireless communication transmission unit is configured to communicate with external mobile terminals and the alerter is configured to generate an alarm sound in case of an emergency; and a touch display screen, a face recognition sensor, a fingerprint reader, and a light sensor are arranged on an outer side of the signal display box, the touch display screen is configured to display information; the face recognition sensor is configured to perform face recognition and face sensing; the fingerprint reader is configured to control an operation of the LED street lamp; the light sensor is configured to perform real-time sensing of external light intensity; the rectify and filter unit, the constant-current protection unit, the power supply, the data memory, the wireless communication transmission unit, the alerter, the sound device, the voltage stabilizer, the touch display screen, the face recognition sensor, the fingerprint reader and the light sensor are electrically connected with the controller; heat sink for improving a heat dissipation performance of the LED street lamp is arranged inside the control box; two sides of the control box defining a plurality of heat dissipation holes; an access door is arranged on a front surface of the control box;

wherein the LED street lamp assembly comprises a first rotary assembly, a plurality of street lamp rods connected with an end of the first rotary assembly, and LED lamp bodies; each of the LED lamp bodies is arranged on an other end relative to the first rotary assembly of the street lamp rod; a first rotary driving motor is arranged inside the first rotary assembly; the first rotary assembly is driven by the first rotary driving motor and rotates along with the lamp rods around the support rod;

wherein the solar panel assembly comprises a second rotary assembly, a plurality of solar panel connect rods connected with an end of the second rotary assembly, and solar panels; the solar panel is arranged on an other end relative to the second rotary assembly of the solar panel connect rod; a second rotary driving motor is arranged inside the second rotary assembly; the second rotary assembly is driven by the second rotary driving motor and rotates along with the solar panel connect rods around the support rod;

wherein the wind power generation assembly comprises a power generation box and at least three power generation fans arranged inside the power generation box; a lateral side of the power generation box defining a ventilation window, and the power generation fans arranged close to the vent window; a storage battery is arranged inside the control box; the heat sink, the first rotary driving motor, the solar panel, the second rotary driving motor, the power generation fans are electrically connected with the controller; a smoke sensor and a temperature sensor are arranged inside the control box; the smoke sensor and the temperature sensor are electrically connected with the controller; a waterproof protective cover relatively covers an external portion of the control box and an external portion of the signal display box; the heat dissipation holes of the control box are long-strip holes; each of the beat dissipation holes range from 3-5 cm in width; a sound control mechanism assembly and a coded lock mechanism are arranged on the external portion of the signal display box; the sound control mechanism assembly and the coded lock mechanism are electrically connected with the controller.

2. The high-intelligent LED street lamp according to claim 1, wherein the support rod comprises a first support rod and a second support rod connected with the first support rod; and a driving cylinder is arranged inside the first support rod; the driving cylinder drives the second support rod to moves up and down relative to the first support rod; the driving cylinder is electrically connected with the controller.

3. The high-intelligent LED street lamp according to claim 1, wherein a first heat dissipating material layer, a second heat dissipating material layer, and a third beat dissipating material layer are formed on the external portion of the signal display box; the first heat dissipating material layer is an aluminum plate layer, the second heat dissipating material layer is a graphite layer; and the third heat dissipating material layer is a pressure sensitive adhesive layer; the first heat dissipating material layer ranges from 0.25-0.35 mm in thickness; the second heat dissipating material layer ranges from 0.15-0.45 mm in thickness; the third heat dissipating material layer ranges from 0.27-0.35 mm in thickness; the third heat dissipating material layer is composed of following components in parts by weight:

95 parts of an acrylate adhesive, 0.1-2.5 parts of an isocyanate crosslinking agent, 25-40 parts of a diluent, 0.65-1 parts of an epoxy crosslinking agent, 4-17 parts of azo compound, 3-15 parts of rosin resin, 6-16 parts of N-nitroso compound, 0.4-2 part of coupling agent, 0.6-1.7 parts of an acrylate polymer having a viscosity of 2500-3500 cps;

wherein the first heat dissipating material layer defining a plurality of through holes; each through bole ranges from 0.3-1 mm in aperture.

4. The high-intelligent LED street lamp according to claim 1, wherein the wireless communication transmission unit comprises a wireless BLUETOOTH unit, a 2.4G wireless communication unit, and a WIFI transmission unit.

5. The high-intelligent LED street lamp according to claim 1, wherein a plurality of solar energy panels are arranged on the solar panel; the solar energy panels are arranged side by side at equal intervals, and the spacing between each of the solar energy panels range from 0.55-0.85 cm.

6. The high-intelligent LED street lamp according to claim 1, wherein a timing controller is arranged inside the control box, and the timing controller is electrically connected with the controller.

* * * * *